US012639602B1

(12) United States Patent
Fredricsson

(10) Patent No.: US 12,639,602 B1
(45) Date of Patent: May 26, 2026

(54) PREDICTING TIME SERIES WITH A ROOT NEAR UNITY

(71) Applicant: Trenderna, Inc., Newark, CA (US)

(72) Inventor: Staffan Anders Fredricsson, Newark, CA (US)

(73) Assignee: Trenderna, Inc., Newark, CA (US)

( * ) Notice: Subject to any disclaimer, the term of this patent is extended or adjusted under 35 U.S.C. 154(b) by 0 days.

(21) Appl. No.: 19/341,590

(22) Filed: Sep. 26, 2025

Related U.S. Application Data

(60) Provisional application No. 63/713,671, filed on Oct. 30, 2024.

(51) Int. Cl.
 *G06F 7/48* (2006.01)
 *G06N 7/08* (2006.01)
(52) U.S. Cl.
 CPC ..................................... *G06N 7/08* (2013.01)
(58) Field of Classification Search
 CPC ....................................................... G06N 7/08
 See application file for complete search history.

(56) References Cited

U.S. PATENT DOCUMENTS

| | | | | |
|---|---|---|---|---|
| 7,716,022 | B1 * | 5/2010 | Park | G06Q 30/0202 703/22 |
| 12,380,369 | B1 * | 8/2025 | Joshi | G06N 20/00 |
| 2022/0004897 | A1 * | 1/2022 | Jadon | G06N 3/045 |
| 2025/0363911 | A1 * | 11/2025 | Zewi | G09B 15/00 |

* cited by examiner

*Primary Examiner* — Nithya J. Moll
(74) *Attorney, Agent, or Firm* — Invoke

(57) ABSTRACT

Techniques for generating time series predictions for a set of time series data with near unit root attributes are disclosed. A system uses a probabilistic model to account for near unit root attributes in a set of time series data. The system generates the probabilistic trend model based on model parameters for an ARMA model. The system generates a transformed point estimate of trend parameters, among the model parameters, to account for a state compression phenomenon in the near unit root time series data. The system uses the transformed point estimate to generate the predictions of future values of the time series using either percentile score forecasts of future time series values or by simulating multiple future sets of time series predictions.

20 Claims, 8 Drawing Sheets

100

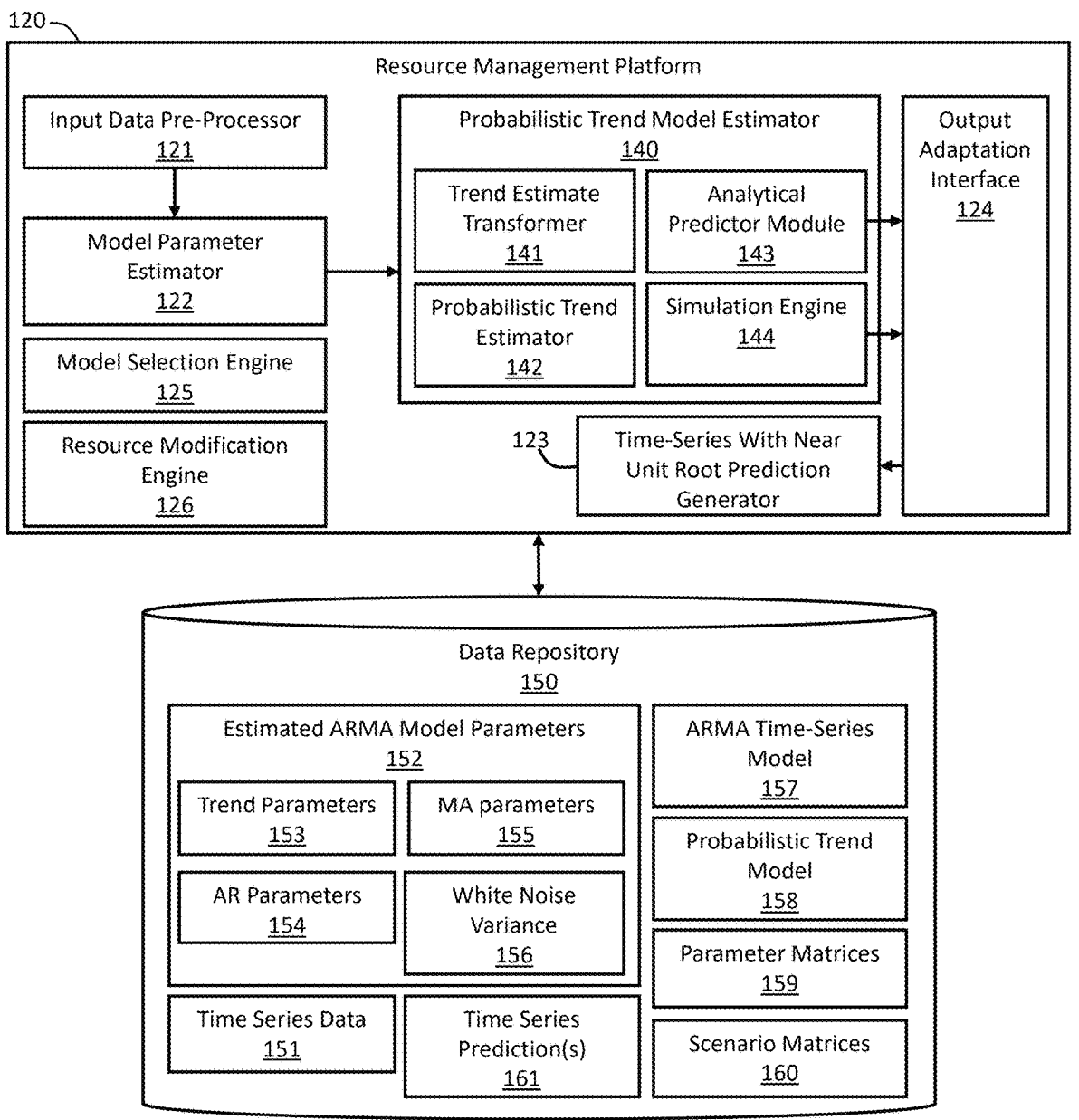

120

Resource Management Platform

Input Data Pre-Processor
121

Model Parameter
Estimator
122

Model Selection Engine
125

Resource Modification
Engine
126

Probabilistic Trend Model Estimator
140

Trend Estimate
Transformer
141

Analytical
Predictor Module
143

Probabilistic Trend
Estimator
142

Simulation Engine
144

Output
Adaptation
Interface
124

123

Time-Series With Near
Unit Root Prediction
Generator

Data Repository
150

Estimated ARMA Model Parameters
152

Trend Parameters
153

MA parameters
155

AR Parameters
154

White Noise
Variance
156

Time Series Data
151

Time Series
Prediction(s)
161

ARMA Time-Series
Model
157

Probabilistic Trend
Model
158

Parameter Matrices
159

Scenario Matrices
160

| | A | B | C | D | E | F | G | H | I |
|---|---|---|---|---|---|---|---|---|---|
| 1 | Tick | ActO | yHat | Trend | Score5O | Score25O | Score50O | Score75O | Score95O |
| 2 | 0 | 7.4852984 | 7.4852984 | 8.0251163 | 7.4852984 | 7.4852984 | 7.4852984 | 7.4852984 | 7.4852984 |
| 3 | 1 | 7.5649373 | 7.4985828 | 8.0303335 | 7.4234373 | 7.4677686 | 7.4985828 | 7.529397 | 7.5737282 |
| 4 | 2 | 7.5844396 | 7.5117466 | 8.0355507 | 7.4060834 | 7.4684183 | 7.5117466 | 7.5550749 | 7.6174098 |
| 5 | 3 | 7.5952668 | 7.5247916 | 8.0407679 | 7.3961177 | 7.4720275 | 7.5247916 | 7.5775558 | 7.6534656 |
| 6 | 4 | 7.6436467 | 7.5377197 | 8.0459851 | 7.3899802 | 7.4771376 | 7.5377197 | 7.5983019 | 7.6854592 |
| 7 | 5 | 7.5755406 | 7.5505326 | 8.0512023 | 7.3862833 | 7.4831804 | 7.5505326 | 7.6178847 | 7.7147819 |
| 8 | 6 | 7.6057359 | 7.5632319 | 8.0564194 | 7.384311 | 7.4898635 | 7.5632319 | 7.6366003 | 7.7421528 |
| 9 | 7 | 7.62059 | 7.5758194 | 8.0616366 | 7.3836357 | 7.4970124 | 7.5758194 | 7.6546264 | 7.7680031 |
| 10 | 8 | 7.6354444 | 7.5882968 | 8.0668538 | 7.3839774 | 7.5045135 | 7.5882968 | 7.6720801 | 7.7926162 |
| 11 | 9 | 7.6216127 | 7.6006657 | 8.072071 | 7.3851406 | 7.5122873 | 7.6006657 | 7.689044 | 7.8161907 |
| 12 | 10 | 7.6435276 | 7.6129277 | 8.0772882 | 7.3869824 | 7.5202764 | 7.6129277 | 7.7055789 | 7.8388729 |
| 13 | 11 | 7.6539077 | 7.6250844 | 8.0825054 | 7.3893944 | 7.5284372 | 7.6250844 | 7.7217316 | 7.8607744 |
| 14 | 12 | 7.6147034 | 7.6371374 | 8.0877226 | 7.3922922 | 7.536736 | 7.6371374 | 7.7375388 | 7.8819826 |
| 15 | 13 | 7.5933099 | 7.6490883 | 8.0929398 | 7.3956084 | 7.5451461 | 7.6490883 | 7.7530304 | 7.9025681 |
| 16 | 14 | 7.5412797 | 7.6609385 | 8.0981569 | 7.3992882 | 7.553646 | 7.6609385 | 7.768231 | 7.9225888 |
| 17 | 15 | 7.6022799 | 7.6726896 | 8.1033741 | 7.4032865 | 7.562218 | 7.6726896 | 7.7831612 | 7.9420927 |
| 18 | 16 | 7.623446 | 7.684343 | 8.1085913 | 7.4075653 | 7.5708474 | 7.684343 | 7.7978387 | 7.9611208 |
| 19 | 17 | 7.6506918 | 7.6959003 | 8.1138085 | 7.4120927 | 7.579522 | 7.6959003 | 7.8122786 | 7.9797079 |
| 20 | 18 | 7.5810096 | 7.7073628 | 8.1190257 | 7.4168412 | 7.5882313 | 7.7073628 | 7.8264943 | 7.9978845 |
| 21 | 19 | 7.6023437 | 7.718732 | 8.1242429 | 7.4217872 | 7.5969666 | 7.718732 | 7.8404974 | 8.0156769 |
| 22 | 20 | 7.619423 | 7.7300093 | 8.1294601 | 7.42691 | 7.6057202 | 7.7300093 | 7.8542983 | 8.0331085 |

FIG. 3B

PREDICTING TIME SERIES WITH A ROOT NEAR UNITY

BENEFIT CLAIMS; RELATED APPLICATIONS; INCORPORATION BY REFERENCE

This application claims the benefit of U.S. Provisional Patent Application 63/713,671, filed Oct. 30, 2024, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to time-series predictions. In particular, the present disclosure relates to predicting time-series values from a time series data set with a root near unity.

BACKGROUND

Autoregressive Moving-Average ARMA(p, q) models are used in the statistical analysis of time series. Given a time series of data $\{x_t\}$, the ARMA model is one potential tool for predicting future values in the series.

The ARMA model is defined by $$x_t = \varepsilon_t + \sum_{i=1}^{p} \varphi_i x_{t-i} + \sum_{i=1}^{q} \theta_i \varepsilon_{t-i} \qquad (2.1)$$

where p and q denote the number of terms in the autoregressive and moving-average component, respectively, and $\varepsilon_t$ is white Gaussian noise with variance $$\sigma_\varepsilon^2.$$

An ARMA model with linear trend is defined by $$y_t = x_t + \alpha + \beta(t - t_{end}) \qquad (2.2)$$

where, with forecasting in mind, we take $t_{end}$ as the time of the last observation in $\{x_t\}$.

An AR Model with linear trend is the subset of ARMA models where the parameters of the moving average component $\theta_i$ are all 0. In this case, equations (2.1) and (2.2) can be written $$x_t = \varepsilon_t + \sum_{i=1}^{p} \varphi_i X_{t-i} \qquad (2.3)$$

$$y_t = x_t + \alpha + \beta(t - t_{end}). \qquad (2.4)$$

This model is generally referred to as an AR (p) model with trend.

Reference is made herein to four sets of process parameters in the model:

the trend parameters $(\alpha, \beta)$, the AR parameters $(\varphi_1, \varphi_2, \ldots, \varphi_p)$, the MA parameters $(\theta_1, \theta_2, \ldots, \theta_q)$, and the white noise variance $$\sigma_\varepsilon^2.$$

The (p+q)-dimensional row vector $$S_t = \begin{cases} (x_{t-1}, x_{t-2}, \ldots, x_{t-p}, \varepsilon_{t-1}, \varepsilon_{t-2}, \ldots, \varepsilon_{t-q}) \text{ if } p > 0 \text{ and } q > 0 & (2.5) \\ (x_{t-1}, x_{t-2}, \ldots, x_{t-p}) \text{ if } q = 0 \\ (\varepsilon_{t-1}, \varepsilon_{t-2}, \ldots, \varepsilon_{t-q}) \text{ if } p = 0 \end{cases}$$

is used to represent the state of the model. The state is significant because if the state $S_t$ and all parameters of the model are known, all future observations $\{y_\tau\}$ for $\tau > t$ are statistically independent of all historic observations $\{y_\tau\}$ for $\tau \le t$. Reference is also made herein to the components of $S_t$ as follows:

$$S_t = \left(s_1^{(t)}, s_2^{(t)}, \ldots, s_{p+q}^{(t)}\right). \qquad (2.6)$$

When the model parameters and the state are known, both point-forecast and interval-forecasts of future observations can be performed as follows:

Consider the detrended (x-level) impulse response as a row vector $$H = \left(h_1, h_2, \ldots, h_{N_p+1}\right) \qquad (2.7)$$

where $N_p$ represents the prediction horizon. This can be determined by setting $S_0 = (0, \ldots, 0)$ and then loading $$\varepsilon_t = \begin{cases} 1 \text{ if } t = 0 \\ 0 \text{ if } t > 0 \end{cases} \qquad (2.8)$$

into Eq. (2.1).

Consider the detrended (x-level) state response as a $((p+q), N_p+1)$ matrix $$W = [w_{ij}] \qquad (2.9)$$

where each row $w_{i*}$ is determined by setting $$s_k^{(0)} = \begin{cases} 1 \text{ if } k = i \\ 0 \text{ if } k \ne i \end{cases} 1 \le k \le p+q \qquad (2.10)$$

and then loading $\varepsilon_t = 0$ for $t \ge 0$ into Eq. (2.1).

A point forecast $\hat{y}_t$ for the future observations $y_t$ is given by $$\hat{y}_t = \varepsilon_0 h_{t+1} + (S_0 * W)_{t+1} + \alpha + \beta(t - 0) \text{ for } 0 \le t \le N_p. \quad (2.11)$$

Since the forecast errors are normally distributed, the distribution of future observations requires only that the variance of the errors be determined. Since the errors $\varepsilon_t$ are independent of each other and the state, $$\sigma_{\varepsilon,t}^2 = \begin{cases} 0 \text{ if } t = 0 \\ \sigma_\varepsilon^2 \sum_{i=1}^t h_i^2 \text{ if } 1 \le t \le N_p \end{cases}. \quad (2.12)$$

The percentile scores of the future observations of $y_t$, which is referred to as $\text{score}_p(y_t)$, is implicitly defined by the probability $$P(y_t \le \text{score}_p) = p / 100 \quad (2.13)$$

where p is a percentile in the range 0-100[%]. Percentile scores can be determined from $$\text{score}_p(y_t) = \text{norminv}\left(\frac{p}{100}, \hat{y}_t, \sigma_{\varepsilon,t}\right) \text{ for } 1 \le t \le N_p \quad (2.14)$$

using a function to compute the inverse of the cumulative distribution function (CDF) of the normal distribution such as the MATLAB® inverse normal function norminv. While examples are provided herein in the MATLAB® programming language, one or more embodiments are implemented equivalently in a different programming language, such as PYTHON, R, JULIA, OCTAVE, SCILAB, FORTRAN, C/C++, WOLFRAM LANGUAGE (MATHEMATICA), LABVIEW, or other suitable programing language.

Near Unit Root Process

Consider the autoregressive component of the ARMA model $$\sum_{i=1}^p \varphi_i x_{t-i}$$

and the corresponding lag operator polynomial $$\varphi(L) = 1 - \sum_{i=1}^p \varphi_i L^i. \quad (2.15)$$

It is the roots of this polynomial, i.e. values of L satisfying $$1 - \sum_{i=1}^p \varphi_i L^i = 0 \quad (2.16)$$

that is referenced when classifying a process as a "near unit root process." There are two special cases that are of interest:

1. The trend stationary model, where stationarity is assumed around a linear deterministic trend, so the roots of the lag operator polynomial lie outside the unit circle, which implies that the sum of autoregressive coefficients $$\sum_{i=1}^p \varphi_i < 1.$$

2. The difference stationary model, where φ(L) contains one positive real unit root, which implies $$\sum_{i=1}^p \varphi_i = 1.$$

Specifically, for ARMA(1,0) models, this implies that the process is a Random Walk.

The problem of modeling near unit root processes has been studied for decades without successfully solving the problem of long-term predictions. Available statistical tests are weak and do not typically rule out either the trend stationary or difference stationary model at commonly used significance levels.

For example, one conventional method for predicting time series with a root near unity is to use a Random Walk model because it is simple and not implausible based on statistical tests. However, its shortcomings for longer-term predictions are widely recognized. An alternative approach is to present multiple different models associated with different prediction time frames. What is needed then is a more precise ARMA model for long-term prediction of time series that exhibit near unit root behavior.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 1A-1B illustrate a system in accordance with one or more embodiments;

FIGS. 3A-3C illustrate an example embodiment;

DETAILED DESCRIPTION

Figure 1A:
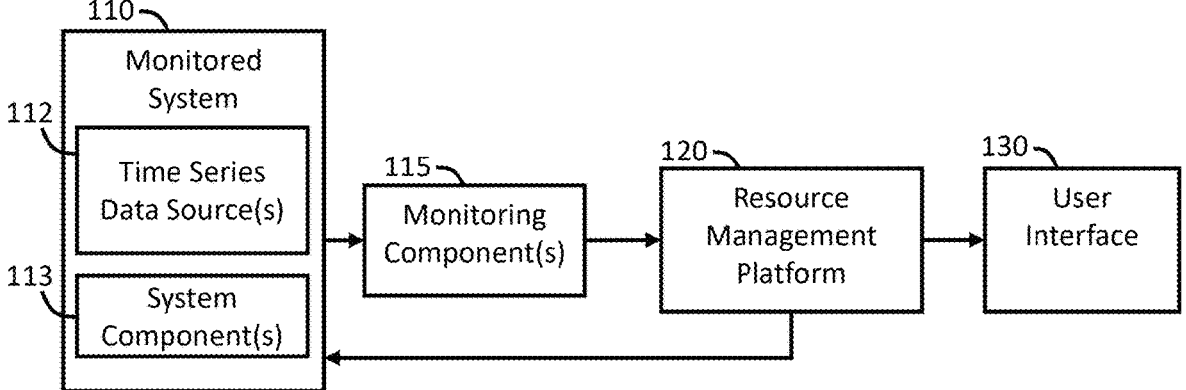

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. NEAR UNIT ROOT PROCESSES AND STATE COMPRESSION

3. NEAR UNIT ROOT TIME SERIES PREDICTION
   ARCHITECTURE
4. NEAR UNIT ROOT TIME SERIES PREDICTION
5. EXAMPLE EMBODIMENTS
6. COMPUTER NETWORKS AND CLOUD NET-
   WORKS
7. HARDWARE OVERVIEW
8. PRACTICAL APPLICATIONS; ADVANTAGES;
   IMPROVEMENTS
9. MISCELLANEOUS; EXTENSIONS

1. General Overview

One or more embodiments generate time series predictions for a set of time series data with near unit root attributes by using a probabilistic model to account for the near unit root attributes. A system generates the probabilistic trend model based on model parameters for an ARMA model. The system generates a transformed point estimate of trend parameters, among the model parameters, to account for a state compression phenomenon affecting predictions on the near unit root time series data. The system uses the transformed point estimate to generate the predictions of future values of the time series using either percentile score forecasts of future time series values or by simulating multiple sets of future time series realizations. The system uses the predictions to modify attributes of systems, applications, or datasets. For example, a forecast predicting attributes of cloud computing resources may forecast an increase in access requests to a database. The system may apply the prediction to modify memory and processing resources available to the database before the system experiences the increase in access requests. As another example, an external application may access a forecast associated with data stored in a system, such as data describing transactions between computing systems or within a network. The external application may predict attributes associated with the stored data and initiate one or more transactions between the computing systems based on the predictions.

One or more embodiments described in this Specification and/or recited in the claims may not be included in this General Overview section.

2. Near Unit Root Processes and State Compression

One or more embodiments of the present disclosure are illustrated by way of example and not by way of limitation. It should be noted that references to "an" or "one" embodiment in this disclosure are not necessarily to the same embodiment, and they mean at least one.

For accurate predictions of ARMA processes, accurate estimation of the trend parameters is of paramount importance. Evidence that this is difficult to achieve in near unit root processes is provided by a little-known phenomenon, referred to herein as state compression. State compression is a hitherto unrecognized phenomenon in time series with near unit root. Embodiments that follow remedy shortcomings in time series prediction and application of predictions in computer, industrial, and technical systems at least in part by addressing state compression.

For an environment where one or more embodiments operate, only the observed time series $\{y_t\}$ is available for a finite time period from $t_{init}$ to $t_{end}$, which, with prediction in mind, is referred to herein as the precursor. All the process parameters and the state variables are estimated from the precursor.

For simplicity, the presentation in this section is based on an AR(1) process with trend according to Eqs. (2.3) and (2.4) and with p=1. Based on the precursor, estimates of the AR parameter and the trend parameters can be provided by an ARMA Estimator such as the model parameter estimator 122 discussed in further detail below. More specifically, the Maximum-Likelihood method is used in one or more embodiments for both the AR and trend parameter estimates.

The estimated time series $\{\hat{x}_t\}$ is arithmetically derived from $\{y_t\}$, and the estimated trend parameters $\hat{\alpha}$ and $\hat{\beta}$ from $$\hat{x}_t = y_t - \hat{\alpha} - \hat{\beta}(t - t_{end}). \tag{2.18}$$

One problem when analyzing real-world, time-series data is that the actual trends are not knowable. Any representations of trends are imaginary concepts that cannot be observed. This problem is avoided by studying simulation experiments where all the parameters of the data generating process are known. The simulation experiment is performed as follows:

For each precursor duration, generate 100,000 random samples of the observed time series $\{y_t\}$, For each sample $\{y_t\}$, record the actual and estimated state variables, $x_{end}$ and $\hat{x}_{end}$, respectively, and For each precursor duration, determine the $$\text{State Variance Ratio} = \frac{\text{var}(\hat{x}_{end})}{\text{var}(x_{end})}. \tag{2.19}$$

The state variance ratio may be used as a quality indicator for a trend estimate. For longer horizons, point-predictions are close to the estimated trend. If the estimated trend deviates significantly from the actual trend, the prediction quality is negatively affected. Consequently, a necessary condition (but not sufficient) for high quality prediction performance is that the state variance ratio is close to 1.

This phenomenon is illustrated by an example for a range of precursor durations, and selected AR parameter values may be represented graphically. One line on a graph with $\varphi_1 = 0.50$ may represent typical performance to be expected outside the near unit root area where the state variance ratio is close to unity across the range of precursor durations, indicating that the estimated trend may be useful. This first line may be expected to be relatively flat and close to a value of 1 for the duration of a time series. A second curve, representing a time series with $\varphi_1 = 0.99$, is characterized by a state variance ratio that ranges from 0.25 to 0.7 across the range of precursor durations, indicating that the prediction quality is significantly impaired by the low quality of the trend estimate. A third curve representing a time series with $\varphi_1 = 0.90$ is characterized by a state variance ratio that deteriorates rapidly as the AR parameter approaches unity. The preceding example demonstrates what is meant by "near unit root" and why prediction of near unit root processes is not readily achieved by conventional modeling techniques.

3. Near Unit Root Time Series Prediction Architecture

FIGS. 1A and 1B illustrate a system 100 in accordance with one or more embodiments. As illustrated in FIGS. 1A and 1B, system 100 includes a monitored system 110, a resource management platform 120, a user interface 130, and a data repository 150. In one or more embodiments, the system 100 may include more or fewer components than the components illustrated in FIGS. 1A and 1B. The components illustrated in FIGS. 1A and 1B may be local to or remote from each other. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 150 is any type of storage unit and/or device (e.g., a file system, database, collection of tables, or any other storage mechanism) for storing data. Furthermore, a data repository 150 may include multiple different storage units and/or devices. The multiple different storage units and/or devices may or may not be of the same type or located at the same physical site. Furthermore, a data repository 150 may be implemented or executed on the same computing system as the resource management platform 120. Additionally, or alternatively, a data repository 150 may be implemented or executed on a computing system separate from the resource management platform 120. The data repository 150 may be communicatively coupled to the resource management platform 120 via a direct connection or via a network.

Information describing time series data 151, estimated ARMA model parameters 152, an ARMA time series model 157, a probabilistic trend model 158, parameter matrices 159, scenario matrices 160, and time series predictions 161 may be implemented across any of components within the system 100. However, this information is illustrated within the data repository 150 for purposes of clarity and explanation.

Referring to FIG. 1A, a monitored system 110 includes one or more system components 113 and one or more time series data sources 112. In some embodiments, the system components 113 may be the time series data sources 112. In alternative embodiments, the system components 113 are separate from the time series data sources 112. Monitoring components 115 monitor the time series data sources 112 to generate observed time series data.

As an example, time series data sources 112 may include system components, including processing components, memory components, power components, and logic circuits. Monitoring components 115 may include physical sensors and/or software modules that monitor operations of the system components 113 to generate the observed time series data.

Examples of sensors include temperature sensors (for CPU and server room temps), humidity sensors (to prevent moisture issues), vibration sensors (to detect physical stress or imbalance), and pressure sensors (for liquid cooling or case pressure). Other sensors, including motion sensors (for proximity and movement), gas sensors (for leaks), and dust/particle sensors, are used in data centers and other computing environments to ensure optimal performance and to prevent failures.

Examples of software modules for monitoring operations of the system include virtual sensors to analyze or estimate bandwidth, latency, and data traffic along network communication channels. In addition, software modules for monitoring operations of the system may include software modules to monitor characteristics of stored values in stored data structures in a database or other data repository, including the presence or absence of values, changes to the stored values in the data structures, the frequency with which the values are created, deleted, and modified, and the frequency of read and write operations to a data storage device.

The monitoring components 115, including sensors and software modules, store observed values as time series data 151 in the data repository 150. The time series data 151 may be stored as tables that include time values and qualitative attribute values or in any other data structure.

The resource management platform 120 includes an input data pre-processor 121. The input data pre-processor 121 ingests the time series data 151 and pre-processes the time series data for analysis and prediction generation. For example, input data pre-processor 121 may transform raw data into a normalized or standardized format suitable for generating ARMA and probabilistic models. In an embodiment, input data pre-processor 121 acts as a bridge between the raw data sources and the analytical capabilities of the probabilistic trend model estimator 140.

In an embodiment, input data pre-processor 121 begins by implementing a series of preprocessing steps to clean, normalize, and/or standardize the data. This involves handling a variety of anomalies, such as managing unexpected data elements, recognizing inconsistencies, or dealing with missing values. Some of these anomalies can be addressed through various methods, like imputation or removal of incomplete records, depending on the nature and volume of the missing data. Input data pre-processor 121 may be configured to handle anomalies in different ways depending on context. Input data pre-processor 121 also handles the normalization of numerical data in preparation for use with models sensitive to the scale of the data. Normalization techniques, such as min-max scaling or z-score standardization, may be applied to bring numerical features to a common scale.

In an embodiment, input data pre-processor 121 includes a feature encoding framework that ensures categorical variables are transformed into a format that can be easily interpreted by the probabilistic trend model estimator 140.

A model parameter estimator 122 receives the processed time series data from the input data pre-processor 121 and generates estimated ARMA model parameters 152. The estimated ARMA model parameters 152 include trend parameters 153, AR parameters 154, MA parameters 155, and white noise variance parameters 156.

The model parameter estimator 122 infers, or estimates, the model parameters from the historic observations of the time series data 151, which may be represented as $\{y_t\}$ for $t \leq t_{end}$. In an embodiment, the parameter estimates are designated $\hat{\alpha}$, $\hat{\beta}$, $\hat{\varphi}_1$, and $$\hat{\sigma}_\varepsilon^2.$$

The model parameter estimator 122 generates estimates of the process parameters using any of a set of enumerated methods (and any method with identical or nearly identical prediction performance) to provide an initial set of estimated process parameters:

the trend parameters $(\hat{\alpha}, \hat{\beta})$,
the AR parameters $(\hat{\varphi}_1, \hat{\varphi}_2, \ldots, \hat{\varphi}_p)$,
the MA parameters $(\hat{\theta}_1, \hat{\theta}_2, \ldots, \hat{\theta}_q)$, and
the white noise variance $$\hat{\sigma}_\varepsilon^2.$$

Examples of methods utilized by the model parameter estimator 122 to estimate the AR parameters include the following:

Maximum-Likelihood: Maximum Likelihood Estimation (MLE) is a method used in statistics to estimate the parameters of a statistical model. The principle behind MLE is to find the set of parameters that maximizes the likelihood function, which measures how likely it is that the observed data would occur given a particular set of model parameters.

Prais-Winsten Procedure: The Prais-Winsten procedure is a method used in regression analysis to correct for serial correlation (specifically first-order autocorrelation) in the errors (residuals) of a linear regression model. Serial correlation occurs when the residuals (errors) from the regression model are correlated over time, which violates one of the assumptions of the ordinary least squares (OLS) method, where residuals are assumed to be independent. When serial correlation is present, OLS estimates are still unbiased, but they are inefficient, and the standard errors of the coefficients are incorrect, leading to unreliable hypothesis tests and confidence intervals. The Prais-Winsten procedure addresses this by transforming the regression model to account for the serial correlation in the errors, specifically a first-order autoregressive process AR(1), where the error term in one period is correlated with the error term in the previous period.

Yule-Walker Procedure: The Yule-Walker procedure is a method used to estimate the parameters of an autoregressive (AR) model by solving the Yule-Walker equations, which relate the autoregressive parameters to the autocovariances of the time series. This procedure is commonly used in time series analysis to fit AR models of order p (AR(p)) and can be applied in situations where the data exhibits serial correlation, helping to estimate the model's parameters efficiently.

Examples of methods utilized by the model parameter estimator 122 to estimate the trend parameters may include the following:

Maximum-Likelihood, as discussed above.

Generalized Least Squares (GLS): Generalized Least Squares (GLS) is a statistical method used to estimate the parameters of a linear regression model when the assumption of homoscedasticity (constant variance of the error terms) and/or independence of the errors is violated. GLS generalizes the Ordinary Least Squares (OLS) method by accounting for heteroscedasticity (non-constant variance of errors) and autocorrelation (correlated errors), providing more efficient and unbiased estimates of the regression coefficients.

Ordinary Least Squares (OLS): Ordinary Least Squares (OLS) is a fundamental method used in linear regression to estimate the parameters of a linear model. It is the most widely used technique for fitting a linear relationship between a dependent variable and one or more independent variables.

The time series $\{\dot{x}_t\}$ is arithmetically derived from $\{y_t\}$ and the estimated trend parameters $\dot{\alpha}$ and $\dot{\beta}$ from $$\dot{x}_t = y_t - \dot{\alpha} - \dot{\beta}(t - t_{end}) \qquad (4.1)$$

where $t_{end}$ represents the Tick of Prediction.

In an embodiment, the model parameter estimator 122 generates parameter estimates by implementing an iterative process. The model parameter estimator 122 invokes a first function to find the maximum-likelihood trend based on $\dot{\varphi}_1 = 1$. Then, the model parameter estimator 122 invokes a second function to find the maximum-likelihood estimate of $\dot{\varphi}_1$ based on the trend identified by the first function. The model parameter estimator 122 iteratively continues to invoke the first and second functions in a trend-$\dot{\varphi}_1$ cycle until the change in the estimate of $\dot{\varphi}_1$ is less than $10^{-5}$.

In an embodiment, the model parameter estimator 122 generates a structure array as an output. An example of a structure array output by a model parameter estimator is represented below:

| EDMPout Field | Descriptive Symbol |
|---|---|
| EDMPout.y | y |
| EDMPout.PREDinT | PREDin.xlsx |
| EDMPout.alphadot | $\dot{\alpha}$ |
| EDMPout.betadot | $\dot{\beta}$ |
| EDMPout.phidot | $(\dot{\varphi}_1, \dot{\varphi}_2, \ldots, \dot{\varphi}_p)$ |
| EDMPout.thetadot | $(\dot{\theta}_1, \dot{\theta}_2, \ldots, \dot{\theta}_q)$ |
| EDMPout.vardot | $\dot{\sigma}_\varepsilon^2$ |
| EDMPout.xdotInit | $\{\dot{x}_{init}\}$ |
| EDMPout.xdotEnd | $\{\dot{x}_{end}\}$ |

A probabilistic trend model estimator 140 receives the model parameter estimates, as represented in the structure array output by the model parameter estimator 122. The probabilistic trend model estimator 140 includes a trend estimate transformer 141, a probabilistic trend estimator 142, and a simulation engine 144.

The trend estimate transformer 141 generates a transformed trend through a transformed state time series with values $$\ddot{x}_t = c(\dot{x}_t, d, p, q) \text{ for } t = t_{init} \text{ and } t = t_{end} \qquad (4.2)$$

where c( ) is a state transform function, $\dot{x}_t$ is defined in Eq. (4.1), $d = t_{end} - t_{init}$ stands for precursor duration, and p, q for the order of the ARMA process.

One reason for transforming the trend is to improve prediction performance.

One class of state transform functions c( ) in Eq. (4.2) is a class of linear functions such that $$\ddot{x}_t = k(d, p, q) * \dot{x}_t \text{ for } t = t_{init} \text{ and } t = t_{end}. \qquad (4.3)$$

One reason to consider this linear class is that analysis of prediction performance is simplified.

In an embodiment, the trend estimate transformer 141 implements a special case of the linear class state transform function $$kone(d) = sqrt\left(\frac{var(x_{end})}{var(\dot{x}_{end})}\right) \qquad (4.4)$$

to substitute k(d, 1,0) in Equation (4.3). Here, kone(d) is the square-root of the inverse end-state variance ratio, as defined in Eq. (2.19).

The point estimate of the transformed trend, $$\hat{u} = (\hat{\alpha}, \hat{\beta}),\qquad(4.5)$$

representing the output of the trend estimate transformer 141, is derived from $$\hat{\alpha} = y_{end} - \ddot{x}_{end}\qquad(4.6)$$

$$\hat{\beta} = \frac{y_{end} - \ddot{x}_{end} - (y_{init} - \ddot{x}_{init})}{t_{end} - t_{init}}.\qquad(4.7)$$

The probabilistic trend estimator 142 receives the transformed trend generated by the trend estimate transformer 141.

Each of the enumerated methods for estimation of the trend parameters by the model parameter estimator 122 is linear in the sense that $\dot{x}$ is independent of the trend $(\alpha, \beta)$. Therefore, $\ddot{x}$ is also independent of the trend $(\alpha, \beta)$. The probabilistic trend estimator 142 considers the transformed trend in Eq. (4.5) as a random variable u, defined by a randomly selected realization $$\{y_t^{(n)}\}$$

of an ARMA process with the same ARMA, trend, and white noise parameters as the estimated parameters for $\{y_t\}$.

The probabilistic trend estimator invokes a simulation technique to characterize the random variable u, initiated by the following operations:

Generate a number N of random realizations $$\{y_t^{(n)}\},$$

where $1 \le n \le N$,

Process each realization through a trend estimate transformer, such as the transformer 141 described in FIG. 1B, and record the trend error components $$e_\alpha^{(n)} = \alpha^{(n)} - \hat{\alpha}^{(n)}\qquad(4.8)$$

and $$e_\beta^{(n)} = \beta^{(n)} - \hat{\beta}^{(n)}\qquad(4.9)$$

in N×1 column vectors, $E_\alpha$ and $E_\beta$, respectively.

A random sample of u with size N can now be defined by the N×2 matrix $$U = (\hat{\alpha}_y, \hat{\beta}_y) + [E_\alpha, E_\beta].\qquad(4.10)$$

This random sample can be used directly in the simulation engine 144, as described in FIG. 1B with either linear or the non-linear transform functions, provided that the sample size N is sufficiently large.

An analytical predictor module 143 requires that the random variable u is defined by its probability density function f(u). Provided that the transform function is linear, as in Eq. (4.4), the probabilistic trend estimator 142 estimates the mean and covariance of $(e_\alpha, e_\beta)$ using statistical methodology for independent samples, such the following:

$$eMean = (\mathrm{mean}(E_\alpha), \mathrm{mean}(E_\beta))\qquad(4.11)$$

$$eCov = \mathrm{cov}(E_\alpha, E_\beta).\qquad(4.12)$$

The trend error components are a linear function of the white Gaussian noise $\{\varepsilon_t\}$ in Eqs. (2.1) and (2.3). Consequently, the trend error components are jointly normal. Furthermore, because of symmetry the population mean of the errors is zero, there is no need for a sample estimate of the mean.

Let u=(a, b) denote a randomly drawn trend estimate, i.e.

$$(a, b) = (\hat{\alpha}_y, \hat{\beta}_y) + e.\qquad(4.13)$$

The probability density function of u can be written $$f(u) = \frac{1}{2\pi |uCov|^{1/2}} e^{-(u-uMean)uCov^{-1}(u-uMean)'/2}\qquad(4.14)$$

where $$uMean = (\hat{\alpha}_y, \hat{\beta}_y) + 0\qquad(4.15)$$

$$uCov = eCov.\qquad(4.16)$$

In an embodiment, the output of the probabilistic trend estimator 142 is a structure array as follows:

| EPTMout Field | Descriptive Symbol |
|---|---|
| EPTMout.alphaHat | $\hat{\alpha}_y$ |
| EPTMout.betaHat | $\hat{\beta}_y$ |
| EPTMout.eMean | eMean |
| EPTMout.eCov | eCov |
| EPTMout.alphaE | $E_\alpha$ |
| EPTMout.betaE | $E_\beta$ |

In an embodiment, the probabilistic trend estimator 142 invokes a set of functions to implement the processes described above to generate a defined number of simulated realizations of a time series such as 100,000 simulated realizations of the time series.

In an embodiment, the trend estimate transformer 141 and the probabilistic trend estimator 142 embody a probabilistic trend model 158. By storing and executing this probabilistic trend model 158, one or more embodiments provide a comprehensive computing framework for modeling the uncertainty inherent in near-unit-root processes. This represents a fundamental advancement over traditional approaches that typically disregard near-unit-root issues and fail to account for the full covariance structure of the trend components.

An analytical predictor module 143 provides the parameters of the probability distribution of the future realizations of the ARMA time series. The parameters are placed in a parameter matrix, where the columns represent sequential ticks t, where each tick defines an interval of time, and each row holds a time series representing sequential values of a parameter.

Within the analytical predictor module 143, operations are implemented with a shifted time scale, where a tick of prediction is represented by 0 in place of $t_{end}$. There are two parameters, the point prediction $\hat{y}_t$ and the standard deviation of the prediction errors $\hat{\sigma}_{y,t}$.

The analytical predictor module 143 performs three operations. In a first operation, a point prediction $\hat{y}_t$ is determined. Eq. (2.11) is followed with the distinction that the impulse response $\hat{h}_t$ and state response $\hat{W}$ are based on estimated ARMA parameters provided by the model parameter estimator 122, as described in FIG. 1B.

The point estimate of the state $\hat{S}_0$ and the error $\varepsilon_0$ can be inferred through Eqs. (2.1)-(2.4) (or equivalently FIG. 2.1) from the detrended $$\hat{x}_t = y_t - \hat{\alpha} - \hat{\beta}(t-0) \text{ for } t \le 0 \tag{4.17}$$

and the estimated ARMA parameters. As a result, there is $$\hat{y}_t = \hat{\varepsilon}_0 \hat{h}_{t+1} + (\hat{S}_0 * \hat{W})_{t+1} + \hat{\alpha} + \hat{\beta}(t-0) \text{ for } 0 \le t \le N_p \tag{4.18}$$

where $N_p$ represents the prediction horizon.

In a second operation, the variance of the prediction errors $$\hat{\sigma}_{y,t}^2$$

is estimated based on the estimated variance of future white Gaussian noise & and the uncertainty in the trend estimate. In embodiments, estimating the variance of the prediction errors includes determining a covariance matrix of trend parameter errors that captures both variance in level and slope parameters and covariance between level and slope parameters. Since these two error components are statistically independent, their individual variances can be added:

$$\hat{\sigma}_{y,t}^2 = \hat{\sigma}_{\varepsilon,t}^2 + \hat{\sigma}_{trend,t}^2 \tag{4.19}$$

where $$\hat{\sigma}_{\varepsilon,t}^2 = \begin{cases} 0 & \text{if } t = 0 \\ \sigma_\varepsilon^2 \sum_{i=1}^{t} \hat{h}_i^2 & \text{if } 1 \le t \le N_p \end{cases} \tag{4.20}$$

The variance caused by the uncertainty of the trend estimate can be determined analytically for the AR(1) case:

$$\hat{\sigma}_{trend,t}^2 = eCov(1,1)(1 - \hat{h}_{t+1})^2 + \tag{4.21}$$
$$2eCov(1,2)(1 - \hat{h}_{t+1})t + eCov(2,2)t^2 \text{ for } 0 \le t \le N_p.$$

In a third operation, the $2 \times (N_p+1)$ Parameter Matrix paraM is formed from $$paraM(1, 1:N_p + 1) = \hat{y}_t \text{ for } 0 \le t \le N_p \tag{X.1}$$

$$paraM(2, 1:N_p + 1) = \hat{\sigma}_{y,t} \text{ for } 0 \le t \le N_p. \tag{X.2}$$

The output of the analytical predictor module 143 is a structure array as follows:

| ANAout Field | Descriptive Symbol |
|---|---|
| ANAout.paraM | paraM |

In an embodiment, the analytical predictor module 143 generates a probability distribution of predicted outcomes in the form of percentile scores for a set of time series data 151. The probability distribution of predicted outcomes may be determined as follows:

$$score_p(y_t) = norminv\left(\frac{p}{100}, \hat{y}_t, \hat{\sigma}_{y,t}\right) \text{ for } 1 \le t \le N_p \tag{4.22}$$

where norminv( ) is defined as in MATLAB®, p represents the percentile on a 0-100[%] scale, with $\hat{y}_t$ and $$\hat{\sigma}_{y,t}^2$$

determined from (4.18) and (4.19), respectively.

The simulation engine 144 places specified variables in identical-sized matrices. The columns in these matrices represent sequential ticks t, and each row holds a time series representing sequential values of the variable—a scenario. Each scenario is randomly selected from the sample space. The ticks are represented by consecutive integers from zero through t. The number of scenarios/rows, nScen, is set to 100,000 for this example embodiment.

The simulation engine 144 defines three component matrices:

⟨G⟩: trend,

⟨H⟩: state response,

⟨M⟩: innovation response, and their sum $$\langle Y \rangle = \langle G \rangle + \langle H \rangle + \langle M \rangle. \tag{4.23}$$

For simulation of the trend uncertainty, the simulation engine 144 defines two nScen×1 vectors, ⟨$E_a$⟩ and ⟨$E_b$⟩, to represent randomly drawn trend errors. Depending on circumstances, there are two alternative methods for supplying the contents of these vectors.

Provided that the state transform function is linear, as in Eq. (4.4), based on eCov in Eq. (4.12) and the use of two independent standard normal random nScen×1 vectors, ⟨$Z_1$⟩ and ⟨$Z_2$⟩, the trend simulation engine applies the following algorithm to the data:

$$\langle E_a \rangle = sqrt[eCov(1, 1)] \cdot \langle Z_1 \rangle \qquad (4.24)$$

$$\langle E_b \rangle = \frac{eCov(1, 2)}{sqrt[eCov(1, 1)]} \cdot \langle Z_1 \rangle + sqrt\left[eCov(2, 2) - \frac{eCov(1, 2)^2}{eCov(1, 1)}\right] \cdot \langle Z_2 \rangle. \qquad (4.25)$$

Alternatively, provided that the number of rows N in $E_\alpha$ and $E_\beta$ is greater than or equal to nScen, the simulation engine 144 determines the following:

$$\langle E_a \rangle = E_\alpha(1 : nScen) \qquad (4.26)$$

$$\langle E_b \rangle = E_\beta(1 : nScen). \qquad (4.27)$$

Let $(0:\tau)$ denote a row vector $(0,1,2, \ldots, \tau)$ and $\langle 1 \rangle$ an nScen$\times(1+\tau)$ matrix of all 1's. The simulation engine 144 determines the following:

$$\langle G \rangle = (\hat{a} \oplus eMean(1) \oplus \langle E_a \rangle) . * \langle 1 \rangle + (\hat{b} \oplus eMean(2) \oplus \langle E_b \rangle) * (0 : \tau). \qquad (4.28)$$

We have an interest in the state impulse response $w_t$ defined by Eq. (2.3) with $\varepsilon_t=0$ for $t \geq 0$, $x_0=1$ and $x_t=0$ for $t<0$. For the AR(1) case with p=1, we have $$w_t = \varphi_1^t \text{ for } 0 \leq t \leq \tau. \qquad (4.29)$$

For simulation of the state response, the simulation engine 144 determines the following:

$$\langle H \rangle = (Y_0 \ominus \hat{a} \ominus eMean(1) \ominus \langle E_a \rangle) * (w_\tau). \qquad (4.30)$$

For simulation of the innovation response, the simulation engine 144 performs a two-operation process. In a first operation, the simulation engine 144 creates a scenario matrix $\langle M0 \rangle$ based on the AR-parameter estimate EDMPout.phildot and the innovation variance estimate EDMPout.vardot.

A second operation considers the uncertainty in the innovation variance estimate, which has a chi-square distribution. When the number of observations in the precursor EDMPout.y is n, that distribution has n−2 degrees of freedom. The simulation engine 144 creates a random sample of a chi-square distributed random variable in a column vector $\langle C_{n-2} \rangle$ with nScen rows using the MATLAB® function chi2rnd( ).

The simulated innovation response can now be written $$\langle M \rangle = sqrt[(n - 2) / \langle C_{n-2} \rangle]. * \langle M0 \rangle \qquad (4.31)$$

The output of the simulation engine 144 is a structure array as follows:

| SIMout Field | Descriptive Symbol |
|---|---|
| SIMout.GS | $\langle G \rangle$ |
| SIMout.HS | $\langle H \rangle$ |
| SIMout.MS | $\langle M \rangle$ |
| SIMout.YS | $\langle Y \rangle$ |

The output adaptation interface 124 provides a simple user interface and coordinates the work of the other components. The output adaptation interface 124 is characterized by configurable prediction parameters, including the following:

prdTime The Tick of Prediction: This is the tick defining $t_{end}$, e.g. in FIG. 4.4, which in turn defines the time series $\{y_t\}$. The default Value is NaN, which causes the Tick of Prediction to the last tick received in the time series data 151.

prdHrzn The Prediction Horizon: This is the ticks corresponding to the value of $N_p$, e.g. in (4.17). The default value is 250 ticks.

pctls There are 5 percentile values, each between 0 and 100, where the cumulative probability distribution of the predicted outcome is scored. The default percentile values are 5, 25, 50, 75 and 95[%].

The parameter matrices 159 output by the analytical predictor module 143 and the scenario matrices 160 output by the simulation engine 144 include the transformed data for generating predictions for time series data with near unit root. The output adaptation interface 124 converts the parameter matrices 159 and scenario matrices 160 into formats accessible by external applications to generate predictions and apply the generated predictions to systems to modify system components and data structures based on the predictions.

For example, the output adaptation interface 124 converts scenario matrices into tables that include the following:

Rows: Individual simulated time series realizations,
Columns: Time steps within the prediction horizon, and
Values: Predicted time series values for each scenario and time step.

This standardized output format enables diverse applications to process the simulations according to their specific requirements, whether through direct statistical analysis, domain-specific transformations (as in reservoir management), or complex digital signal processing pipelines.

A time series with near unit root prediction generator 123 ingests the data output by the output adaptation interface 124 to generate predictions based on one or both of the parameter matrices 159 output by the analytical predictor module 143 and the scenario matrices 160 output by the simulation engine 144.

A resource modification engine 126 interfaces with external applications and systems, including the monitored system 110, to modify parameters of system components 113 based on the predictions generated by one or more of the analytical predictor module, the simulation engine 144, and the prediction generator 123. For example, the system components may include computers, servers, processors, and logic circuits in a computing system. The resource modification engine 126 may reconfigure computers, servers, processors, and logic circuits to re-route data traffic to increase/decrease bandwidth based on the predictions, increase/decrease processing capacity available to one or more devices, such as client devices accessing cloud resources, and increase/decrease memory available to one or more devices. The resource modification engine 126 may reconfigure data structures based on the predictions, such as by generating/removing partitions in memory, and generating, deleting, or modifying data objects, tables, table components, and values based on the predictions.

According to an example embodiment, the time series data 151 includes temperature data generated by a network of temperature sensors over a period of time spanning years or decades. The resource management platform 120 may predict future temperature values using the probabilistic trend model estimator 140 based on detecting near unit root behavior in the time series temperature data. In another example, the time series data 151 includes pollution data, such as the concentration of pollutants in air, water, or soil. The resource management platform 120 may predict future temperature values using the probabilistic trend model estimator 140 based on detecting near unit root behavior in the time series temperature data. The resource modification engine 126 may control pollution-generating systems, such as vehicles and facilities, to modify pollution-generating operations based on predicted time series pollution values.

According to another example, the time series data 151 includes population data, including data describing the change in growth of a population or subset of individuals in a population. Population data may include mortality rates and long-term health trends. The resource management platform 120 may predict future population values using the probabilistic trend model estimator 140 based on detecting near unit root behavior in the time series population data.

According to another example, the time series data 151 includes signal processing data. In telecommunications and electronics, certain signals or noise sequences, such as those with long memory or persistent fluctuations, can exhibit near unit root behavior. Examples include electrical signal time series and network traffic data. The resource modification engine 126 may control access to telecommunications and electronics components or initiation operations to repair or replace components based on predicted data transmission characteristics.

According to another example, the time series data 151 includes geological data. Seismic activity, like the occurrence of earthquakes, can sometimes show near unit root behavior, especially when considering patterns over long geological timeframes. The resource management platform 120 may predict future seismic activity using the probabilistic trend model estimator 140 based on detecting near unit root behavior in the time series seismic data.

According to another example, the time series data 151 includes epidemiological data. The spread of diseases over time, especially chronic diseases with long incubation periods or widespread environmental impacts (e.g., respiratory illnesses), can exhibit near unit root characteristics in terms of persistence and long-term effects. The resource management platform 120 may predict future epidemiological data using the probabilistic trend model estimator 140 based on detecting near unit root behavior in the time series epidemiological data.

According to another example, the time series data 151 includes heart rate variability data. Time series of physiological signals, like heart rate variability, may show near unit root behavior, where changes in health conditions or stress persist for extended periods. The resource management platform 120 may predict future heart rate data using the probabilistic trend model estimator 140 based on detecting near unit root behavior in the time series heart rate data. The resource modification engine 126 may generate a recommendation for medical treatment of an individual based on the predicted future heart rate data.

According to another example, the time series data 151 includes energy usage data. Energy usage time series, such as in markets with slow changes in consumption patterns due to infrastructure, regulatory changes, or technological shifts, may exhibit near unit root behavior. The resource modification engine 126 may generate a recommendation for modifying energy usage based on the predicted future energy usage data. Additionally, or alternatively, the system may modify energy usage resources, such as by storing energy in batteries, turning on and off energy generation sources, including power plants, wind farms, and solar arrays, and rerouting power along a power infrastructure network based on the predicted energy usage data.

According to another example, the time series data 151 includes meteorological data, such as in precipitation and drought patterns. These data may show persistent behavior with long-lasting deviations from typical weather patterns. The resource modification engine 126 may generate a recommendation for water storage and transport as well as infrastructure investment and building based on the predicted future meteorological data.

According to another example, the time series data 151 includes social science data. For example, the time series data 151 may describe voting patterns. Political or sociological time series data, like voter preferences, party support, or public opinion, can exhibit persistence, such as in stable political climates, showing near unit root characteristics. The resource management platform 120 may predict future sociological data using the probabilistic trend model estimator 140 based on detecting near unit root behavior in the time series sociological data.

According to another example, the time series data 151 represents long-term trends in educational achievement (e.g., literacy rates, graduation rates). These data may show near unit root behavior due to the persistent influence of policy or socioeconomic factors. The resource management platform 120 may predict future trends in educational achievement based on detecting near unit root behavior in the time series educational data.

According to another example, the time series data 151 includes reservoir and water resource management data. The resource management platform 120 may predict water levels that consider both natural inflow variations and controlled outflows, where the persistence of drought or flood conditions exhibits near unit root behavior. The resource modification engine 126 may generate a recommendation for storing and distributing water in a water management system based on the predicted future reservoir and water resource management data.

According to another example, the time series data 151 includes financial data. A financial system may generate predictions of portfolio depletion risk using the scenario matrices 160 generated by the simulation engine 144 and normalized by the output adaptation interface 124, where market returns and withdrawal patterns create persistent effects. The resource modification engine 126 may generate recommendations for redistribution of assets among external entities based on the predicted future financial data.

According to another example, the time series data 151 includes supply chain and inventory system data. Demand shocks and supply disruptions may have long-lasting impacts on inventory levels that result in the supply chain data exhibiting near unit root behavior. The resource modification engine 126 may generate a recommendation for modifying production and/or distribution of goods among manufacturing, storage, and sales entities based on the predicted future supply chain data.

In an embodiment, a model selection engine 125 selects a model for generating predictions for the time series data 151 based on estimated model parameters generated by the model parameter estimator 122. The model selection engine 125 may select the ARMA time-series model 157 for generating predictions without generating the probabilistic trend model 158 based on determining the time series data 151 is stationary. The model selection engine 125 may select the probabilistic trend model estimator 140 for generating predictions based on determining the time series data 151 has a root near unity, such as a root of less than 1 and of 0.97 or greater.

In one or more embodiments, the resource management platform 120 refers to hardware and/or software configured to perform operations described herein for generating predictions based on time series data with root near unity and modifying systems based on the predictions. Examples of operations for generating predictions based on time series data with root near unity are described below with reference to FIG. 2.

In an embodiment, the resource management platform 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a hardware router, a hardware switch, a hardware firewall, a mainframe, a television, a content receiver, a set-top box, a mobile handset, a smartphone, and a personal digital assistant (PDA).

In one or more embodiments, user interface 130 refers to hardware and/or software configured to facilitate communications between a user and the resource management platform 120. Interface 130 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 130 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, interface 130 is specified in one or more other languages, such as Java, C, or C++.

4. Near Unit Root Time Series Prediction

Figure 2:
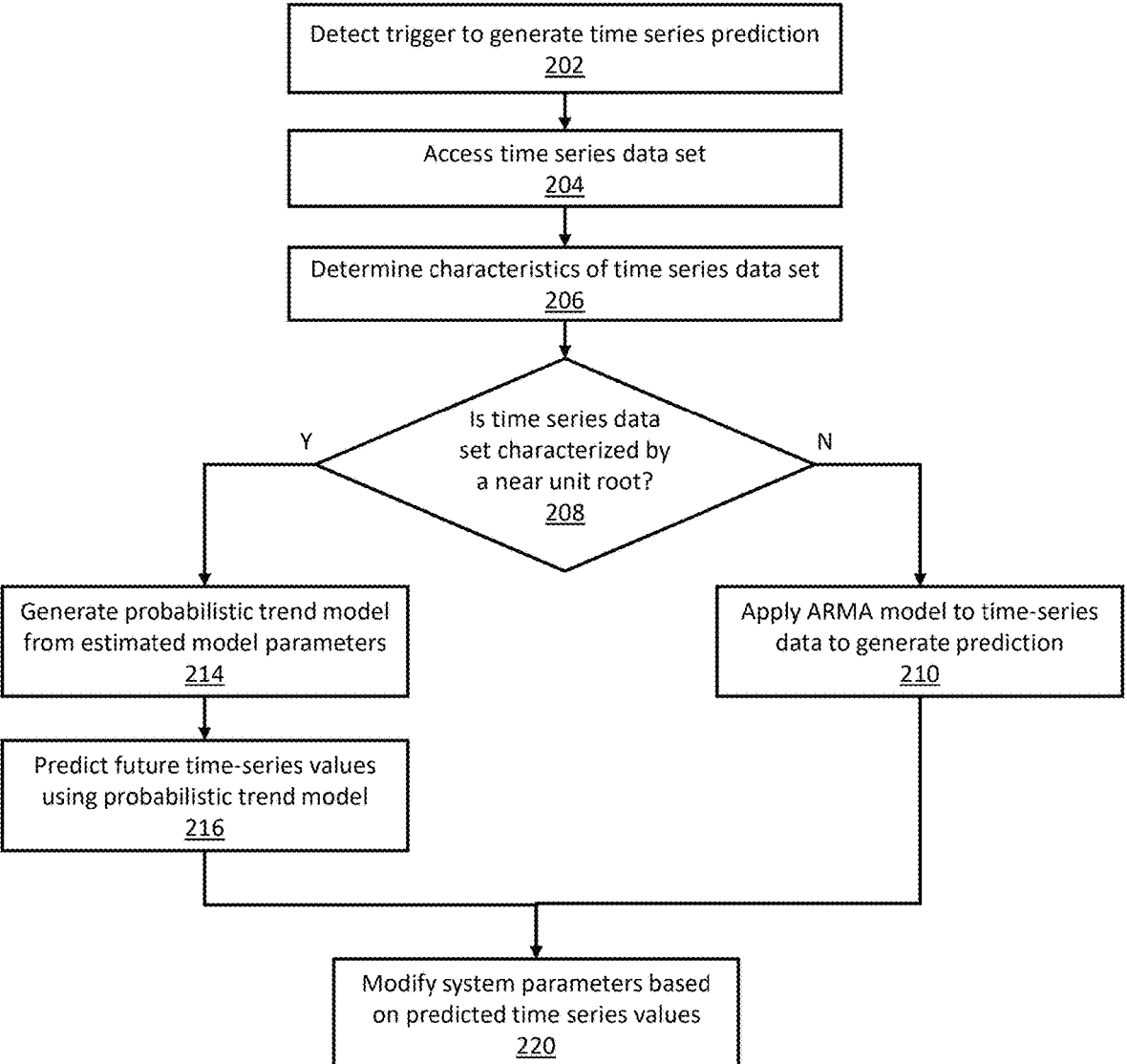
FIG. 2 illustrates an example set of operations for near unit root time series prediction in accordance with one or more embodiments.

FIG. 2 illustrates an example set of operations for generating predictions that account for near unit root in time series data in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the system detects a trigger to generate a time series prediction (Operation 202). A host system may monitor another system to obtain observed time series data. The trigger may include receiving the observed time series data, receiving a defined amount of observed time series data, identifying a characteristic in the observed time series data, detecting the passage of a specified period of time, or any other trigger. For example, the system may monitor a storage location in memory to determine if the storage location includes the time series data. The system may monitor transaction data of a memory controller to determine if a set of data transmitted to memory corresponds to the time series data. An application that manages the ingestion of the time series data may generate and transmit a notification to a time series prediction application that the time series data is received and stored in memory.

In an embodiment, a trigger includes receiving an input from an application that specifies a location in memory of a set of time series data. In an alternative embodiment, the trigger includes detecting the occurrence of an event, such as the receipt of a specified amount or type of time series data, that does not necessarily include receiving any input from an application. In an embodiment, a system monitors time series data for values, sets of values, and trends that the system identifies as anomalous. The system may trigger the time series prediction based on detecting an anomaly. According to an alternative embodiment, the system triggers the time series prediction by detecting one or more particular values in the time series data that are not necessarily anomalous but that are specified as prediction-triggering values.

Based on detecting the trigger, the system accesses the time series data set (Operation 204). Accessing the time series data includes reading the time series data from a particular location in a computer's memory. In one example, accessing the time series data includes generating one or more requests to a database server to access the time series data stored in the database.

Where the system stores a large set of time series data spanning long periods of time and potentially different types of time series data, the system may access a particular subset of stored time series data by selecting data according to a source, a time, and/or a type. For example, the system may retrieve one year of stored time series data from a particular monitored system by specifying time identifiers and source identifiers of the data.

The system determines characteristics of the time-series data (Operation 206). The system may estimate model parameters for an ARMA model based on the time series data to determine the characteristics of the time series data. Determining the characteristics may include determining if the time series data exhibits near unit root behavior.

In an embodiment, the model parameter estimator 122 described in FIG. 1B generates estimated ARMA model parameters, including trend parameters, AR parameters, MA parameters, and white noise variance parameters. The model parameter estimator 122 infers, or estimates, the model parameters from the historic observations of the time series data. The model parameter estimator 122 generates estimates of the process parameters using any of a set of enumerated methods (and any method with identical or nearly identical prediction performance) to provide an initial set of estimated process parameters.

In an embodiment, the model parameter estimator 122 generates parameter estimates by implementing an iterative process. The model parameter estimator 122 invokes a first function to find the maximum-likelihood trend based on $\dot{\varphi}_1=1$. Then, the model parameter estimator 122 invokes a second function to find the maximum-likelihood estimate of $\dot{\varphi}_1$ based on the trend identified by the first function. The model parameter estimator 122 iteratively continues to invoke the first and second functions in a trend-$\dot{\varphi}_1$ cycle until the change in the estimate of $\dot{\varphi}_1$ is less than $10^{-5}$.

The system determines if the time series data set is characterized by a root near unity (Operation 208). In an embodiment, the system determines if the time series data set is characterized by a root near unity by determining at least one root of a lag operator polynomial of the ARMA model has a magnitude greater than, or equal to 0.9, and less than 1.0. Additionally, or alternatively, the system may determine the time series data is characterized by a root near unity by determining a sum of autoregressive parameters approaches but does not equal unity, causing state compression effects wherein variance of estimated state variables is substantially reduced compared to variance of actual state variables.

If the system determines that the time series data is not characterize by a root near unity, the system applies an ARMA model to the time series data to generate a prediction for the time series data (Operation 210). The ARMA model may be defined by equation 2.1, described above. In an example where the system determines the time series data is non-stationary, the system may apply a differencing operation to the time series data prior to applying the ARMA model to the data.

If the system determines that the time series data is characterized by a root near unity, the system generates a probabilistic trend model from the estimated model parameters (Operation 214). The probabilistic trend model generates a transformed trend based on the model parameter estimates as described in equation 4.2 above. The probabilistic trend model includes a probabilistic trend estimator to invoke a simulation technique to determine trend error components and a probability density function based on the transformed trend identified in the time series data. In an embodiment, the probabilistic trend estimator invokes a set of functions to implement the processes described above to generate a defined number of simulated realizations of a time series such as 100,000 simulated realizations of the time series.

By incorporating a probabilistic trend model through a computer-implementation of the Trend Estimate Transformer and Probabilistic Trend Estimator, one or more embodiments provide a more comprehensive computing framework for modeling the uncertainty inherent in near-unit-root processes. This represents a fundamental advancement over traditional approaches that typically disregard near-unit-root issues and fail to account for the full covariance structure of the trend components.

The system predicts future time series values using the probabilistic trend model (Operation 216). For example, the system may apply the transformed data output by the probabilistic time series model to an analytical prediction module that generates percentile forecasts for future realizations. For example, the analytical prediction module may generate a table that includes rows, ticks, or future time intervals as well as columns that represent percentiles of a predicted outcome distribution. The values in the fields may represent the predicted time series values associated with the corresponding time interval/percentile pairs. The system may generate a prediction graph that represents the curve of the predicted values over time.

In an embodiment, the parameters of the probability distribution are organized in a parameter matrix having a multi-dimensional structure. One dimension of the parameter matrix corresponds to future time points, and another dimension of the parameter matrix corresponds to different parameters of the probability distribution. Each element of the parameter matrix includes a value of a corresponding parameter at a corresponding future time point.

Additionally, or alternatively, the system may apply the transformed data output by the probabilistic time series model to a simulation engine 144 that generates simulations of future predictions rather than estimated probability distributions. In an embodiment, the predictions of future values of the time series include a plurality of equally likely future realizations of the time series generated through simulation by the simulation engine 144.

In an embodiment, the system estimates parameters of a probability distribution of future realizations of a time series and computes statistical properties of the future realizations of the time series, including percentile scores at specified percentiles of the probability distribution.

The system modifies system parameters based on the predicted time series values (Operation 220). Modifying system parameters may include, for example, executing one or more operations to modify data structures associated with the time series data by modifying data values, modifying data object attributes, and modifying a size, number, and type of data structures. As an example, a system may initiate a transaction between two entities to modify data values and/or attributes stored by the two entities. Modifying system parameters may include initiating the transfer of data packets between computing systems, stopping the transfer of data packets between computing systems, and rerouting of data packets in a data network based on the time series predictions. Modifying the system parameters may include modifying resources available to clients or tenants accessing cloud resources. For example, the system may increase a number of processors or servers accessible to a client device. A system may modify cloud-based applications available to a client device. Additionally, or alternatively, the system may generate recommendations to a resource manager to modify resources in a system.

5. Example Embodiments

A detailed example is described below for purposes of clarity. Components and/or operations described below should be understood as one specific example that may not be applicable to certain embodiments. Accordingly, components and/or operations described below should not be construed as limiting the scope of any of the claims.

Figure 3A:
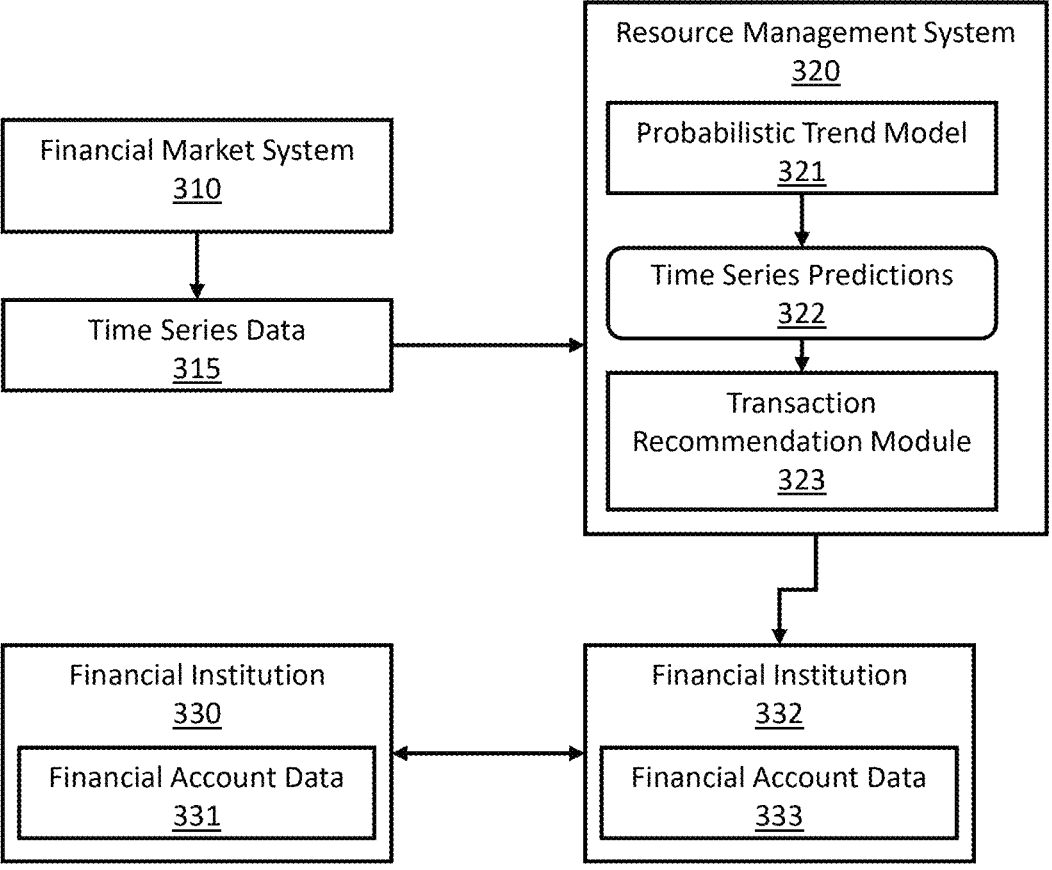

FIG. 3A illustrates an example of generating near unit root time series predictions to modify data stored in financial institutions. A resource management system 320 accesses time series data 315 generated by a financial market system 310. The time series data 315 may include, for example, market values for financial instruments. The time series data 315 includes values for the financial instruments over time, particularly over long periods of time, such as three years or longer.

The resource management system 320 estimates model parameters for an ARMA model based on the time series data 315 to determine the characteristics of the time series data. Determining the characteristics may include determining if the time series data exhibits near unit root behavior. The resource management system 320 estimates ARMA model parameters, including trend parameters, AR parameters, MA parameters, and white noise variance parameters. The resource management system 320 infers, or estimates, the model parameters from the historic observations of the time series data. The resource management system 320 generates the estimates of the process parameters using an MLE technique.

The resource management system 320 generates the parameter estimates by implementing an iterative process. The resource management system 320 invokes a first function to find the maximum-likelihood trend based on $\dot{\varphi}_1=1$. Then, the resource management system 320 invokes a second function to find the maximum-likelihood estimate of $\dot{\varphi}_1$ based on the trend identified by the first function. The resource management system 320 iteratively continues to invoke the first and second functions in a trend-$\dot{\varphi}_1$ cycle until the change in the estimate of $\dot{\varphi}_1$ is less than $10^{-5}$.

The resource management system 320 generates the probabilistic trend model 321 based on the estimated parameters. The probabilistic trend model 321 generates data representing a transformed trend in the time series data based on the model parameter estimates as described in equation 4.2 above. The probabilistic trend model 321 includes a probabilistic trend estimator to invoke a simulation technique to determine trend error components and a probability density function based on the transformed trend identified in the time series data. In an embodiment, the probabilistic trend estimator invokes a set of functions to implement the processes described above to generate a defined number of simulated realizations of a time series such as 100,000 simulated realizations of the time series.

Based on the trend data output by the probabilistic trend model 321, the resource management system 320 generates a set of time series predictions 322. The set of time series predictions 322 predicts values for the time series data for a defined time into the future such as 1-3 years into the future based on 10 years of time series data 315.

FIG. 3B illustrates a portion in time of the probability distribution 324 of predicted outcomes generated by an analytical predictor module of the resource management system 320. The probability distribution 324 is configured with a column specifying ticks, or time intervals, and columns representing percentile values for predicted scores, including fifth percentile, twenty-fifth percentile, fiftieth percentile, seventy-fifth percentile, and ninety-fifth percentile.

Figure 3C:
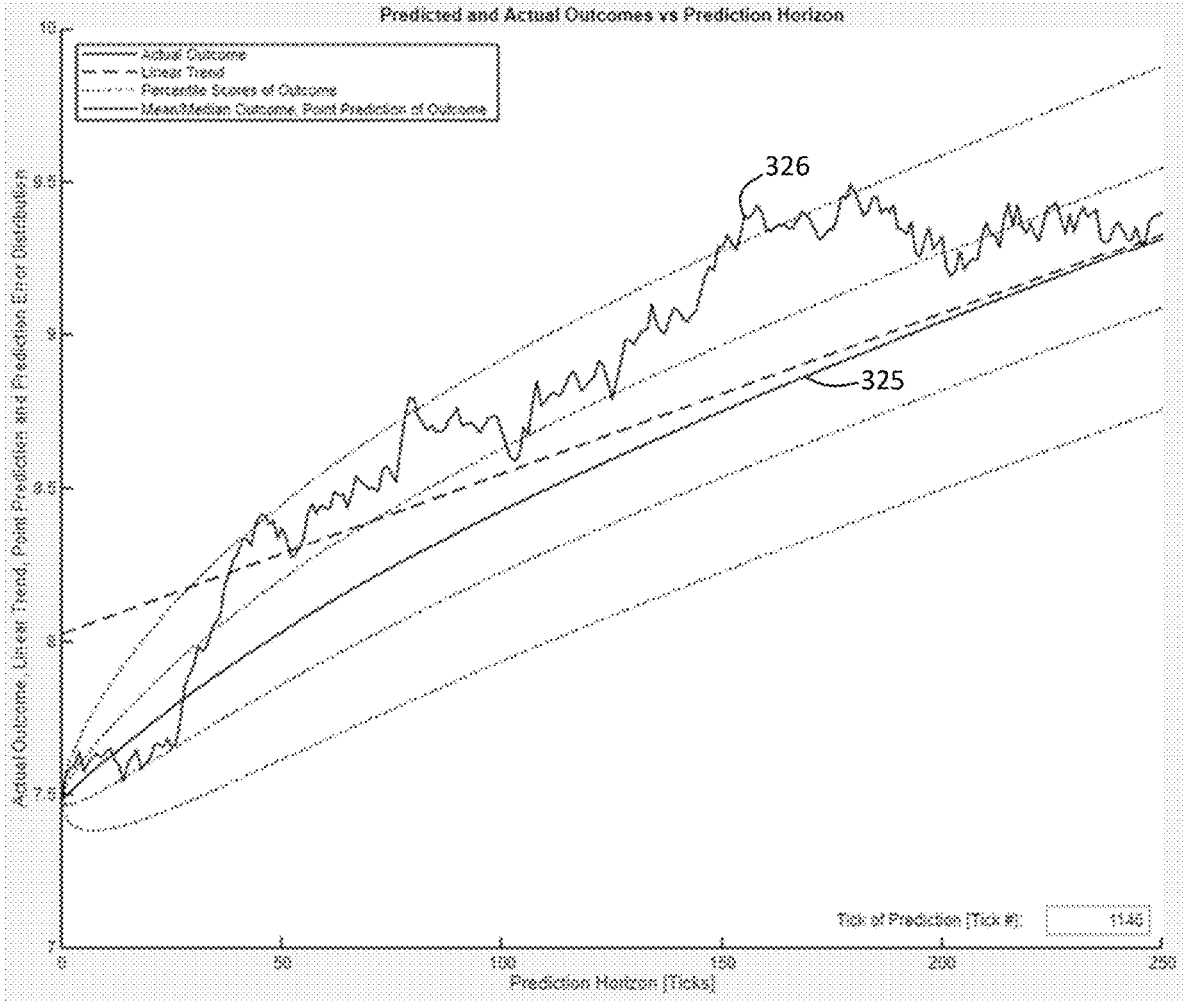

FIG. 3C illustrates a graphical representation of a point-prediction 325 generated by the resource management system 320. Also shown in FIG. 3C is the actual outcome 326.

A transaction recommendation module 323 analyzes the time series predictions 322 to generate recommendations for modifying financial accounts. For example, based on the time series predictions 322, a particular set of financial instruments associated with a financial account at a financial institution 332, and a set of financial priorities specified by an entity associated with the account, the transaction recommendation module 323 recommends initiating a financial transaction to modify the financial account data 333 stored by the financial institution 332 and the financial account data 331 stored by the financial institution 330.

In one or more embodiments, the recommendation to initiate the transaction is based, in part, on the characteristics of the time series predictions 322 that account for near unit root in the time series data 315. For example, an ARMA model implemented without the probabilistic trend model 321 may generate a different set of predictions that would not trigger a recommendation to modify the financial account data 333.

Figure 4:
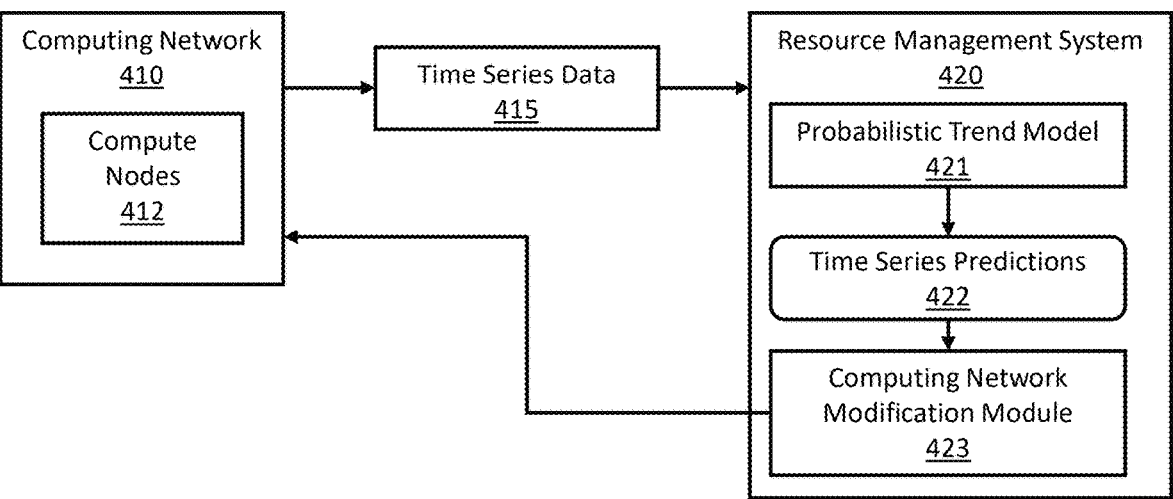
FIG. 4 illustrates an example embodiment.

FIG. 4 illustrates an example of generating near unit root time series predictions to modify compute nodes 412 in a computing network 410. A resource management system 420 accesses time series data 415 generated by a computing network 410. The time series data 415 may include, for example, bandwidth measurements, latency estimates, efficiency and usage data of the compute nodes 412, and data transmission data between compute nodes 412. The time series data 415 includes values for the computing network characteristics over time, particularly over long periods of time, such as one or more years.

The resource management system 420 estimates model parameters for an ARMA model based on the time series data 415 to determine the characteristics of the time series data. Determining the characteristics may include determining if the time series data exhibits near unit root behavior. The resource management system 420 estimates ARMA model parameters, including trend parameters, AR parameters, MA parameters, and white noise variance parameters. The resource management system 420 infers, or estimates, the model parameters from the historic observations of the time series data. The resource management system 420 generates the estimates of the process parameters using an MLE technique.

The resource management system 420 generates the parameter estimates by implementing an iterative process. The resource management system 420 invokes a first function to find the maximum-likelihood trend based on $\dot{\varphi}_1=1$. Then, the resource management system 420 invokes a second function to find the maximum-likelihood estimate of $\dot{\varphi}_1$ based on the trend identified by the first function. The resource management system 420 iteratively continues to invoke the first and second functions in a trend-$\dot{\varphi}_1$ cycle until the change in the estimate of $\dot{\varphi}_1$ is less than $10^{-5}$.

The resource management system 420 generates the probabilistic trend model 421 based on the estimated parameters. The probabilistic trend model 421 generates data representing a transformed trend in the time series data based on the model parameter estimates as described in equation 4.2 above. The probabilistic trend model 421 includes a probabilistic trend estimator to invoke a simulation technique to determine trend error components and a probability density function based on the transformed trend identified in the time series data. In an embodiment, the probabilistic trend estimator invokes a set of functions to implement the processes described above to generate a defined number of simulated realizations of a time series such as 100,000 simulated realizations of the time series.

Based on the trend data output by the probabilistic trend model 421, the resource management system 420 generates a set of time series predictions 422. The set of time series predictions 422 predicts values for the time series data for a defined time into the future such as 6 months into the future based on one year of time series data 415.

A computing network modification module 423 analyzes the time series predictions 422 to generate instructions for modifying compute nodes 412. For example, based on the time series predictions 422, the computing network modification module 423 initiates operations to increase a number of processors available to a set of processes accessing the compute nodes 412. For example, the predictions 422 may indicate that in the long term, an increase in processing requirements of the processes will cause decreased performance of the computing network 410. The computing network modification module 423 increases processors available to improve long term performance of the computing network 410.

In one or more embodiments, the modifications to the computing network 410 are based, in part, on the characteristics of the time series predictions 422 that account for near unit root in the time series data 415. For example, an ARMA model implemented without the probabilistic trend model 421 may generate a different set of predictions that would not trigger a modification to the computing network 410.

In addition, the computing network modification module 423 may generate an alert and/or recommendation prior to modifying the compute nodes 412. Recommendations may include upgrading hardware and software components, adding or upgrading load balancing hardware or software, installing or uninstalling one or more applications in the compute nodes 412, installing or upgrading a firewall, and implementing additional monitoring components, such as physical or software sensors.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
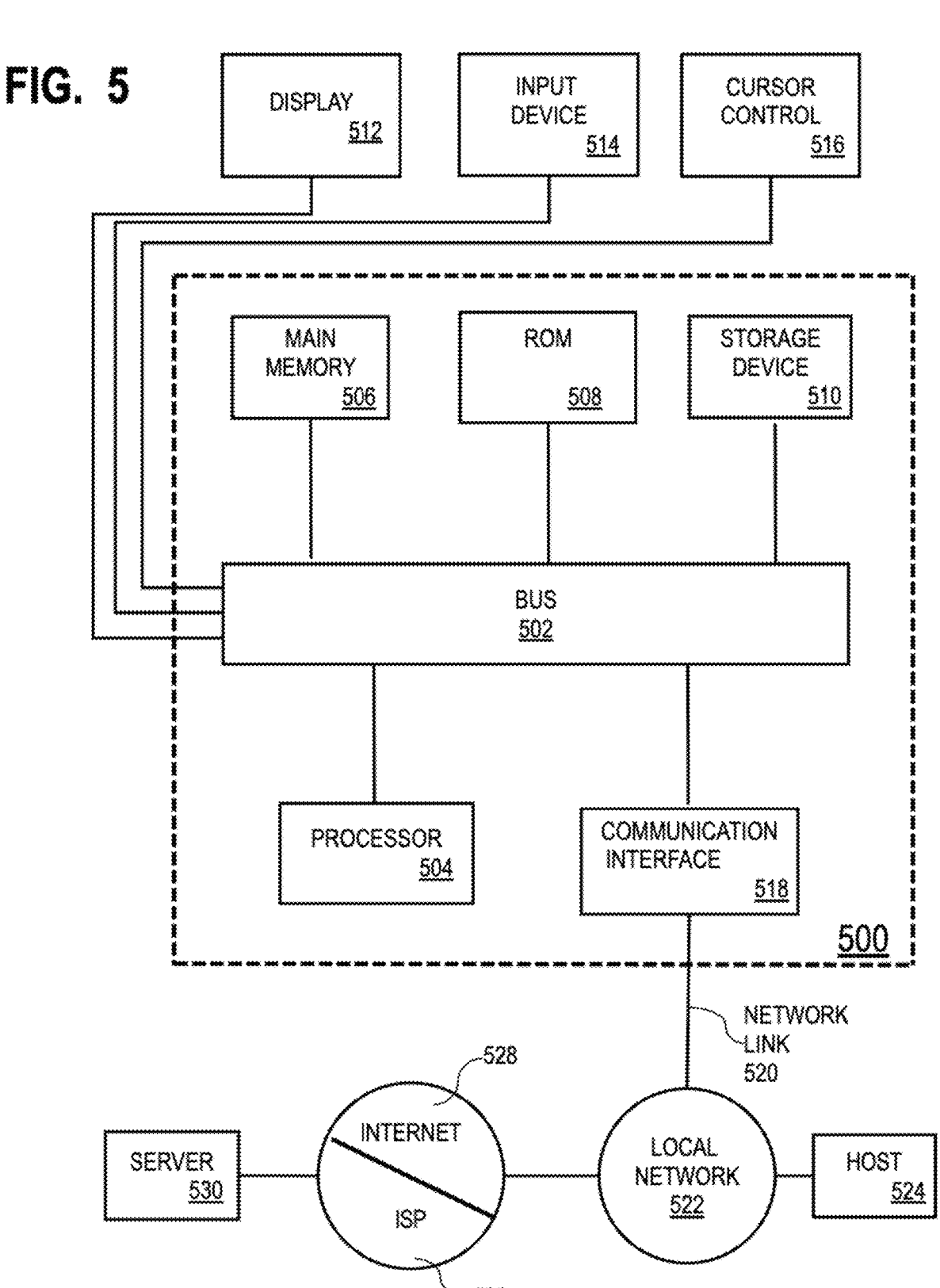
FIG. 5 shows a block diagram that illustrates a computer system in accordance with one or more embodiments.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read-only memory (ROM) 508 or other static storage device coupled to bus 502 for storing static information and instructions for processor 504. A storage device 510, such as a magnetic disk, optical disk, or a Solid State Drive (SSD) is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Practical Applications; Advantages; Improvements

One or more embodiments described herein represent a significant technical advancement in computer-implemented ARMA modeling by introducing a novel probabilistic framework that bridges a fundamental gap in the field's treatment of near-unit-root processes. Prior approaches, from the 1980s onward, have been constrained by their reliance on fixed, deterministic trend models, which fail to adequately capture the complex dynamics of near-unit-root environments. The innovation of one or more embodiments lies in the introduction of a probabilistic trend model specifically designed for ARMA-based time series, which offers a technical solution for addressing the challenging middle ground between trend stationary and difference stationary models.

By incorporating a probabilistic trend model through a computer-implementation of the a trend estimate transformer 141 and the probabilistic trend estimator 142, as described in FIG. 1B, one or more embodiments provide a more comprehensive computing framework for modeling the uncertainty inherent in near-unit-root processes than existing systems. This represents a fundamental advancement over traditional approaches that typically disregard near-unit-root issues and fail to account for the full covariance structure of the trend components.

The probabilistic trend model supports two different predictor architectures, the analytical predictor module 143 and the simulation engine 144, as described in FIG. 1B, both aimed at different areas of application. The analytical predictor module 143 is fast and simple. It provides percentile score forecasts for future realizations of the precursor and any other variable that can be derived from the probability distribution of these future realizations.

The simulation engine 144 is flexible and its output provides a versatile interface for numerous practical applications requiring additional digital signal processing (DSP) stages. One particularly illustrative example involves water reservoir management, where the persistence of hydrological conditions exhibits near unit root behavior.

In reservoir management applications, annual waterflow in rivers can be modeled as an ARMA time series based on historical data. The simulation engine 144 generates multiple future waterflow realizations, each representing a possible future scenario. For practical reservoir management, each simulated realization undergoes additional processing through a DSP stage that models water usage as a constant outflow rate. The DSP stage calculates water contents at each time step by adding the simulated inflows and subtracting the modeled outflows, thereby determining if and when the reservoir becomes empty in each scenario. The probability of reservoir depletion at any given future time can then be estimated by computing the ratio of scenarios where the reservoir is empty to the total number of simulated realizations.

This same methodological approach applies to numerous resource depletion and accumulation problems across different domains. In retirement planning, for instance, the technique addresses the critical question of portfolio longevity by simulating future investment returns (which often exhibit near unit root characteristics) and modeling regular withdrawals, allowing calculation of the probability that a retiree will exhaust their funds. Similarly, natural resource extraction companies can use this approach to assess depletion risks under various extraction scenarios. Inventory management systems can evaluate stockout probabilities considering both demand uncertainty and supply chain disruptions. Computing system management platforms may use the approach to predict performance disruptions based on predicted future demands on existing computing resources.

For example, a system may obtain time-series data from sensors that monitor data flow and/or data transactions in a network. The system predicts future data traffic to allocate resources in the network. Allocating resource may include, for example, acquiring additional computing resources, such as network servers, central processing units (CPUs), or graphics processing units (GPUs) in one or more data centers. The GPUs may be specialized hardware accelerators that performs parallel processing to handle computationally intensive workloads, such as implementing artificial intelligence (AI) tasks, machine learning (ML) tasks, high-performance computing (HPC) tasks, 3D rendering, and large-scale data analytics. Attempting to predict future data transmission characteristics using conventional ARMA models may result in under-allocating resources, resulting in data bottlenecks, over-use of computing resources, and increased network latency. The system instead predicts the future data transmission characteristics in the network based on the probabilistic trend model and resulting simulations generated by the analytical predictor module 143 or the simulation engine 144, described above. As a result, the system takes into account the permanent effects of shocks in the time-series data and predicts corresponding lasting changes to data usage in the network. Based on the probabilistic trend model and resulting simulations generated by the analytical predictor module 143 or the simulation engine 144, the system allocates network resources including the network servers, CPUs, GPUs, or other network nodes.

One advantage of one or more embodiments lies in the simulation engine's ability to generate probabilistically valid realizations that properly account for the near unit root characteristics of the underlying process. This ensures that the persistence of shocks and the long-term uncertainty are correctly represented, enabling more accurate risk assessment in applications where conventional time series methods would underestimate long-term variability. The standardized scenario matrix output format allows diverse applications to implement their domain-specific processing requirements while benefiting from the improved statistical properties of the generated simulations.

9. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method for predicting a time series with a root near unity, the method comprising:
   receiving, by a computer system, a set of time series data comprising a plurality of observations over time;
   estimating, by the computer system, deterministic model parameters for an autoregressive moving average (ARMA) model based on the time series, wherein the deterministic model parameters comprise trend parameters, and wherein the estimating produces estimated state variables;
   generating, by the computer system, a probabilistic trend model based on:
   (a) generating a transformed point estimate of trend parameters based on applying a state transform function to the estimated state variables, wherein the state transform function is configured to counteract state compression in near unit root processes; and (b) characterizing uncertainty in the trend parameters by either:
    (i) generating a random sample of trend errors through simulation, or
    (ii) deriving a probability distribution from said random sample of trend errors; and
generating, by the computer system, predictions of future values of the time series using the probabilistic trend model, wherein the predictions are generated based on:
    (a) the transformed point estimate of the trend parameters,
    and
    (b) uncertainty in the trend parameters; and
outputting, by the computer system, prediction results in a format suitable for application-specific processing.

2. The method of claim 1, wherein generating predictions of future values of the time series comprises:
    generating estimates of parameters of a probability distribution of future realizations of the time series; and
    computing statistical properties of the future realizations of the time series including percentile scores at specified percentiles of the probability distribution,
    wherein the prediction results comprise the deterministic model parameters of the probability distribution of future realizations.

3. The method of claim 1, wherein generating predictions of future values comprises:
    generating a plurality of simulated future realizations of the time series,
    wherein the prediction results comprise the simulated future realizations for processing through additional domain-specific transformations.

4. The method of claim 1, wherein the predictions of future values are represented as parameters of a probability distribution of future values of the time series, and
    wherein the prediction results include the parameters of the probability distribution.

5. The method of claim 4, wherein the parameters of the probability distribution are organized in a parameter matrix having a multi-dimensional structure,
    wherein one dimension of the parameter matrix corresponds to future time points and another dimension of the parameter matrix corresponds to different parameters of the probability distribution, and
    wherein each element of elements of the Parameter Matrix comprise a value of a corresponding parameter at a corresponding future time point.

6. The method of claim 1, wherein the predictions of future values of the time series comprise a plurality of equally likely future realizations of the time series generated through simulation, and
    wherein the prediction results include the plurality of equally likely future realizations for processing through additional domain-specific transformations.

7. The method of claim 1, wherein the predictions of future values of the time series comprise percentile scores at specified percentiles of a probability distribution of future values of the time series, and
    wherein the prediction results include the percentile scores for direct interpretation of prediction uncertainty.

8. The method of claim 1, wherein the predictions of future values of the time series comprise parameters of a probability distribution of future values of the time series, and wherein the prediction results include the parameters of the probability distribution for statistical analysis of future outcomes.

9. The method of claim 1, wherein estimating the deterministic model parameters comprises iteratively:
    estimating the trend parameters based on a current estimate of autoregressive parameters;
    estimating the autoregressive parameters based on the current estimate of the trend parameters; and
    repeating until convergence is achieved.

10. The method of claim 1, wherein the time series with a root near unity is characterized by:
    at least one root of a lag operator polynomial of the ARMA model having a magnitude between 0.9 and 1.0; or
    a sum of autoregressive parameters that approaches but does not equal unity, causing state compression effects wherein variance of estimated state variables is substantially reduced compared to variance of actual state variables,
    wherein near unit root behavior of the near unit root processes represents an intermediate case between trend stationary processes having all roots outside a unit circle and difference stationary processes having at least one root on the unit circle.

11. The method of claim 1, wherein characterizing uncertainty in the trend parameters comprises:
    determining a covariance matrix of trend parameter errors that captures both variance in level and slope parameters and covariance between level and slope parameters; and
    using the covariance matrix to model joint uncertainty in the trend parameters.

12. The method of claim 1, wherein generating predictions further accounts for uncertainty from future innovations based on an estimated innovation variance from the ARMA model, and
    wherein total prediction uncertainty combines both the uncertainty in the trend parameters and the uncertainty from future innovations.

13. The method of claim 1, wherein the state transform function comprises a function $c(\hat{x}\_t, d, p, q)$ that transforms estimated state variables $\hat{x}\_t$ based on:
    d representing a precursor duration defined as a difference between an end time and an initial time of the time series;
    p representing an autoregressive order of the ARMA model; and
    q representing a moving average order of the ARMA model,
    wherein the state transform function is configured to produce transformed state variables $\ddot{x}\_t$ that compensate for state compression effects in near unit root processes.

14. The method of claim 13, wherein the state transform function is a linear function of a form: $\ddot{x}\_t = k\,(d, p, q) \times \hat{x}\_t$ wherein $k(d, p, q)$ is a scaling factor that depends on a precursor duration d, the autoregressive order p, and a moving average order q, and wherein the scaling factor is selected to increase variance of the estimated state variables to compensate for variance reduction in near unit root processes.

15. The method of claim 14, wherein for an AR(1) model where p=1 and q=0, a scaling factor $k(d, p, q)$ reduces to $k(d)=\mathrm{sqrt}(\mathrm{var}(x\_{end})/\mathrm{var}(\hat{x}\_{end}))$, wherein $\mathrm{var}(x\_{end})$ represents variance of actual end state variables and $\mathrm{var}(\hat{x}\_{end})$ represents variance of estimated end state variables.

16. A computer-implemented method for predicting a time series with a root near unity, the method comprising:
    receiving time series data;
    estimating model parameters from the time series data, wherein the estimating produces estimated state variables;
    generating a probabilistic trend model based on:
        applying a state transformation to the estimated state variables, wherein the state transformation compensates for systematic errors in the estimated state variables relative to actual state variables, wherein the systemic errors result from trend estimation uncertainty in near unit root processes; and
        characterizing uncertainty in trend parameters;
    generating predictions of future values of the time series that incorporate the probabilistic trend model; and
    outputting the predictions.

17. The method of claim 16, wherein generating predictions comprises implementing at least one of:
    an analytical predictor that computes parameters of a probability distribution of future values; or
    a simulation engine that generates multiple scenario realizations of future values through Monte Carlo simulation.

18. The method of claim 16, wherein the state transformation compensates for systematic errors in estimated state variables relative to actual state variables,
    wherein the systematic errors result from trend estimation uncertainty in near unit root processes.

19. A computer system for predicting a time series with a root near unity, the computer system comprising:
    one or more processors;
    memory storing instructions that, when executed by the one or more processors, cause the system to:
    receive a time series comprising a plurality of observations over time;

estimate deterministic model parameters for an autoregressive moving average (ARMA) model based on the time series, wherein the deterministic model parameters comprise trend parameters, and wherein the estimating produces estimated state variables;
generate a probabilistic trend model by:
    (a) generating a transformed point estimate of the trend parameters based on applying a state transform function to the estimated state variables, wherein the state transform function is configured to counteract state compression in near unit root processes; and
    (b) characterizing uncertainty in the trend parameters by either: (i) generating a random sample of trend errors through simulation, or (ii) deriving a probability distribution from said random sample of trend errors;
generate predictions of future values of the time series based on the probabilistic trend model, wherein the predictions are generated based on:
    (a) the transformed point estimate of the trend parameters, and
    (b) uncertainty in the trend parameters; and
output prediction results in a format suitable for application-specific processing.

20. The computer system of claim 19, wherein the instructions cause the system to generate predictions by implementing:
    an analytical predictor module that generates parameters of a probability distribution of future values and organizes them in a parameter matrix; and
    a simulation engine that generates a plurality of simulated scenario realizations organized in one or more scenario matrices.

* * * * *